United States Patent
Hill et al.

(10) Patent No.: US 12,339,513 B2
(45) Date of Patent: Jun. 24, 2025

(54) SMALL FORM FACTOR FLATDROP PULLING BULLET

(71) Applicant: Clearfield, Inc., Minneapolis, MN (US)

(72) Inventors: John P. Hill, Oak Grove, MN (US); Donovan Hample, Otsego, MN (US); Randy T. VanHorn, Princeton, MN (US)

(73) Assignee: Clearfield, Inc., Minneapolis, MN (US)

( * ) Notice: Subject to any disclaimer, the term of this patent is extended or adjusted under 35 U.S.C. 154(b) by 175 days.

(21) Appl. No.: 18/300,659

(22) Filed: Apr. 14, 2023

(65) Prior Publication Data

US 2024/0345357 A1    Oct. 17, 2024

(51) Int. Cl.
 *G02B 6/54* (2006.01)
 *H02G 1/08* (2006.01)

(52) U.S. Cl.
 CPC .............. *G02B 6/54* (2013.01); *G02B 6/545* (2023.05); *H02G 1/081* (2013.01)

(58) Field of Classification Search
 CPC ........... G02B 6/54; G02B 6/545; H02G 1/081
 See application file for complete search history.

(56) References Cited

U.S. PATENT DOCUMENTS

| | | | | |
|---|---|---|---|---|
| 5,181,402 A | * | 1/1993 | Faessler | B65D 63/08 292/318 |
| 5,992,187 A | * | 11/1999 | Derman | E05B 67/003 70/30 |
| 6,266,469 B1 | * | 7/2001 | Roth | G02B 6/4465 385/136 |
| 6,396,993 B1 | * | 5/2002 | Giebel | H02G 1/081 385/139 |
| 10,353,156 B2 | * | 7/2019 | Hill | G02B 6/3889 |
| 2005/0111811 A1 | * | 5/2005 | Cooke | G02B 6/44715 385/136 |
| 2010/0202748 A1 | * | 8/2010 | Pierce | H02G 1/081 385/136 |
| 2014/0097554 A1 | * | 4/2014 | Fenton | B29C 65/542 264/261 |
| 2016/0349474 A1 | * | 12/2016 | Kowalczyk | F16G 11/00 |

* cited by examiner

*Primary Examiner* — Michael Stahl
(74) *Attorney, Agent, or Firm* — TROUTMAN PEPPER LOCKE LLP; Alison L. McCarthy; Mark Lehi Jones (57) ABSTRACT

A cable pulling device including a clamshell housing including a first elongate clamshell and a second elongate clamshell configured to engage the first elongate clamshell such that the clamshell housing can house a distal end piece disposed at a distal end of a cable. The device can include a cord extending from a first end to a second end, wherein the first end and the second end being configured to extend through a bifurcate aperture disposed at a distal end of the distal end piece to form a loop. The cable pulling device can include a locking ring configured to surround and hold together the first elongate clamshell and the second elongate clamshell.

20 Claims, 7 Drawing Sheets

SMALL FORM FACTOR FLATDROP PULLING BULLET

FIELD OF THE DISCLOSURE

The present disclosure relates generally to cable pulling devices and more particularly to low profile cable pulling devices.

BACKGROUND

Data, voice, and other communication networks are increasingly using fiber optics to carry information. Fiber optic cables are generally lighter and more fragile than their conductive counterparts, which can lead to difficulty installing fiber optic cabling. During installation, fiber optic cables must be routed from an origination point to a distal terminal point, and this is often done by pulling cables through enclosed spaces, such as conduits, ducts, pipes, and the like.

The process of pulling a cable through a conduit can be difficult and can result in damage to the distal end of the cable, which may include a connector necessary for completing the connection from origination point to the terminal point. Thus, there is a need for improvement in the methods and devices used for pulling fiber optic cables from one point to another.

SUMMARY

According to one aspect, the present disclosure is directed to a cable pulling device. The cable pulling device can include a clamshell housing including a first elongate clamshell and a second elongate clamshell configured to engage the first elongate clamshell such that the clamshell housing can house a distal end piece disposed at a distal end of a cable. The device can include a cord extending from a first end to a second end, the first end and the second end being configured to extend through a bifurcate aperture disposed at a distal end of the distal end piece to form a loop. The cable pulling device can include a locking ring configured to surround and hold together the first elongate clamshell and the second elongate clamshell.

In some embodiments, the clamshell housing can further include a locking tab disposed at a proximal portion of the clamshell housing and configured to prevent the locking ring from being removed from the clamshell housing.

In some embodiments, the locking ring can include a slot configured to engage the clamshell housing to prevent rotation of the locking ring.

In some embodiments, the cord can include a knot formed in the loop such that the knot prevents the loop from passing through the bifurcate aperture. The knot can be formed distal to the bifurcate aperture.

In some embodiments, the clamshell housing can further include a cord groove formed from the first elongate clamshell and the second elongate clamshell. The cord groove can be configured to facilitate securing a distal portion of the clamshell housing by wrapping the cord around the first elongate clamshell and the second elongate clamshell in the cord groove.

In some embodiments, the first elongate clamshell can include at least one tongue, and the second elongate clamshell can include at least one groove. Alternatively, or additionally, the second elongate clamshell can include at least one tongue, and the first elongate clamshell can include at least one groove. Each tongue can mate with a respective groove on the opposite clamshell to prevent the first elongate clamshell and the second elongate clamshell from slipping relative to one another, particularly in the longitudinal direction.

In some embodiments, the first elongate clamshell can include a plurality of teeth configured to engage with a ribbed cable reinforcement section of the cable. The second elongate clamshell can include a plurality of teeth configured to engage with the ribbed cable reinforcement section of the cable.

According to another aspect, the present disclosure relates to a cable pulling system. The system can include a distal end piece configured to be disposed at a distal end of a cable and extending from a proximal portion to a distal portion. The distal end piece can include a bifurcate aperture disposed at the distal portion and configured to receive a first end and a second end of a cord to form a loop extending distally from the bifurcate aperture. The cable pulling system can further include a clamshell housing including a first elongate clamshell and a second elongate clamshell configured to engage the first elongate clamshell such that the first elongate clamshell and the second elongate clamshell house the distal end piece.

The system can include a locking ring configured to surround and hold together the first elongate clamshell and the second elongate clamshell at respective proximal portions of the first and second elongate clamshells.

In some embodiments, the first elongate clamshell and the second elongate clamshell form a generally figure-eight shaped opening configured to engage a generally figure-eight shaped wire jacket.

According to another aspect, the present disclosure relates to a method of preparing a cable for pulling. The method can include placing a first elongate clamshell on a distal end piece, placing a second elongate clamshell on the distal end piece in alignment with the first elongate clamshell, sliding a locking ring over the first elongate clamshell and the second elongate clamshell, inserting a first end and a second end of a cord through a bifurcate aperture such that a loop is formed in the cord at a distal end of the distal end piece, and wrapping the cord around the first elongate clamshell and the second elongate clamshell.

In some embodiments, sliding the locking ring can include locking the ring in axial relation to the first elongate clamshell and the second elongate clamshell. Sliding the locking ring can further include engaging a slot of the ring with the clamshell housing.

In some embodiments, wrapping the cord around the first elongate clamshell and the second elongate clamshell can include wrapping the cord in a cord groove.

In some embodiments, placing the first elongate clamshell on the distal end piece and placing the second elongate clamshell on the distal end piece can include aligning a plurality of teeth of the first elongate clamshell and a plurality of teeth of the second elongate clamshell with a ribbed cable reinforcement section of the cable.

DETAILED DESCRIPTION

Aspects of the present disclosure are directed to cable pulling systems. While the disclosed technology is described in some parts of this disclosure in relation to optical fiber, those having skill in the art will recognize that the disclosed technology is not so limited and can be applicable to other scenarios and applications. For example, embodiments of the wire pulling system may be configured to accept a variety of cables including optical fiber, coaxial, twisted pair, as nonlimiting examples. Various embodiments of cable pulling systems disclosed herein protect cable ends from damage during pulling, facilitate smooth pulling, such as through a conduit, and allow for easy and rapid removal by an end user. For example, the cable pulling system can be installed by a manufacturer, used during a cable installation, and removed by the end user.

Figure 1:
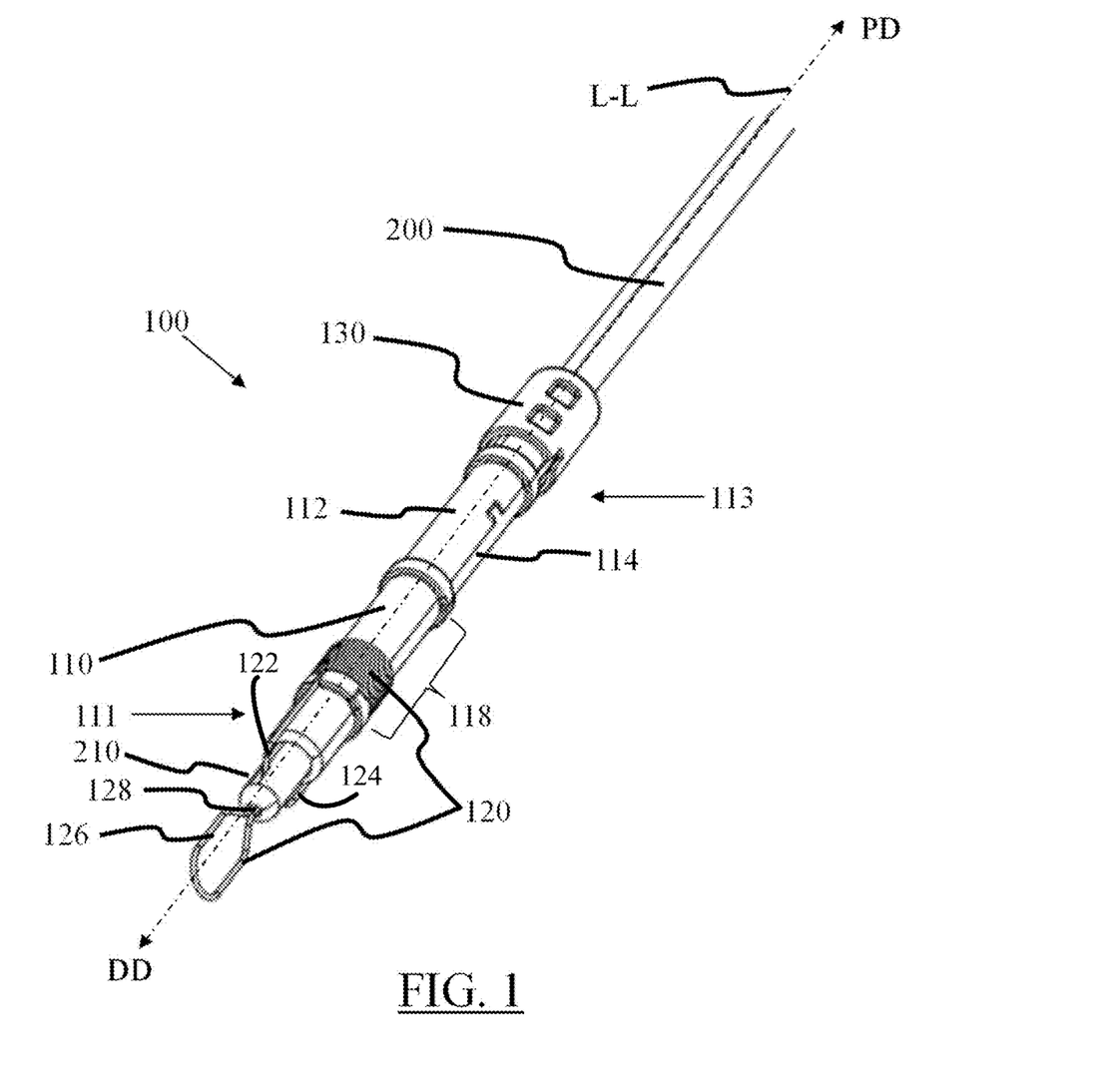
FIG. 1 provides a perspective view of an example cable pulling system, in accordance with the present disclosure.
Figure 2:
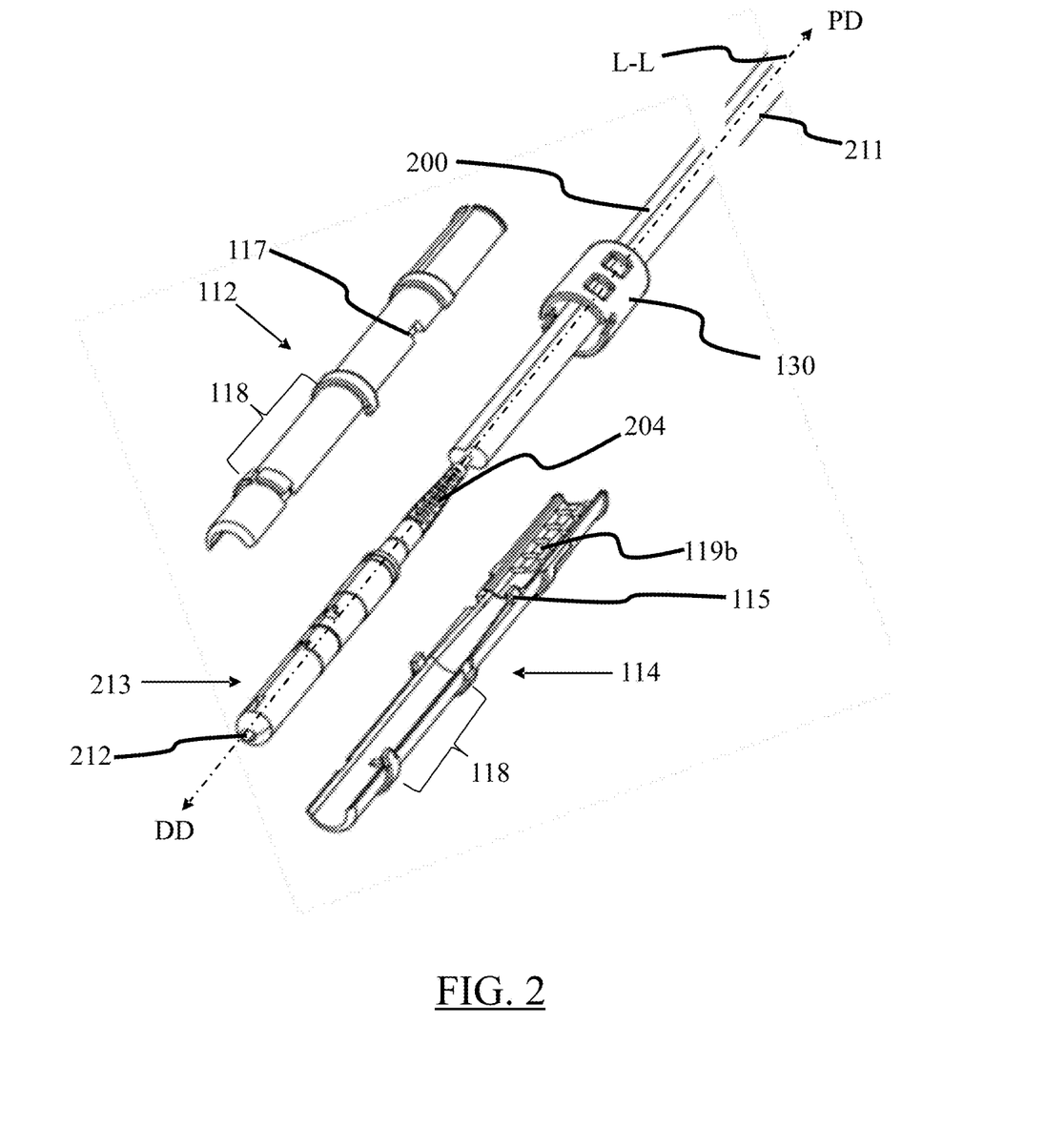
FIG. 2 provides an exploded view of an example cable pulling system, in accordance with the present disclosure.

FIG. 1 shows an example cable pulling system 100. FIG. 2 shows an exploded view of the cable pulling system 100 of FIG. 1. The cable pulling system 100 can further include a clamshell housing (110) including a first elongate clamshell (112) and a second elongate clamshell (114) configured to engage the first elongate clamshell (112) such that the first elongate clamshell (112) and the second elongate clamshell (114) house the distal end piece (210). The cable pulling system 100 and its subcomponents generally extend along a longitudinal axis L-L, and reference is made herein to a proximal direction PD and a distal direction DD, which can be thought of generally as the direction from which the cable 200 is being pulled and the direction in which the cable 200 is being pulled, respectively.

The system 100 can include a locking ring (130) configured to surround and hold together the first elongate clamshell (112) and the second elongate clamshell (114) at respective proximal portions (111a, 111b) of the first (112) and second (114) elongate clamshells. Locking ring 130 is described in more detail in relation to FIGS. 6A-6B.

In some embodiments, the cord (120) can include a knot (128) formed in the loop (126) distal to the bifurcate aperture (212) such that the knot (128) prevents the loop (126) from passing through the bifurcate aperture (212). As used herein, the term "bifurcate" means branching from one to at least two. As such a bifurcate aperture is intended to be an opening which branches into two or more side openings.

In some embodiments, the clamshell housing (110) can further include a cord groove (118) formed from the first elongate clamshell (112) and the second elongate. The cord groove (118) is configured to facilitate securing a distal portion (113) of the clamshell housing (110) by wrapping the cord (120) around the first elongate clamshell (112) and the second clamshell in the cord groove (118).

Figure 3A:
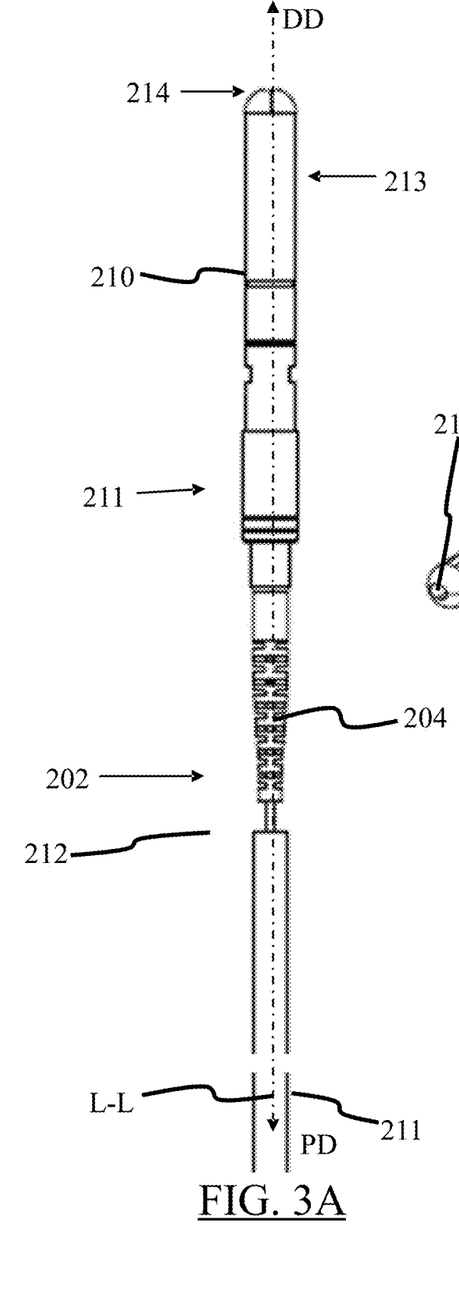
FIG. 3A provides a side view of an example cable for use in a cable pulling system, in accordance with the present disclosure.
Figure 3B:
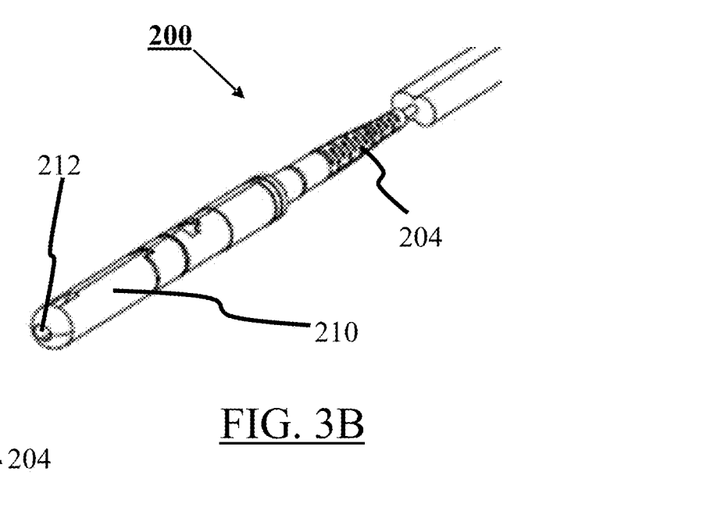
FIG. 3B provides a perspective view of an example cable for use in a cable pulling system, in accordance with the present disclosure.
Figure 4A:
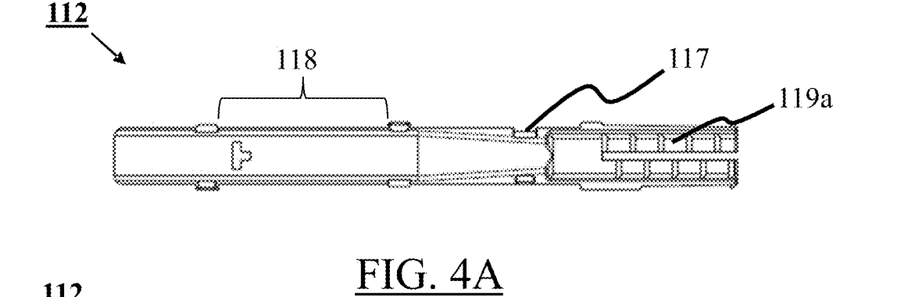
FIG. 4A provides a top view of an example first clamshell of a cable pulling device, in accordance with the present disclosure.
Figure 4B:
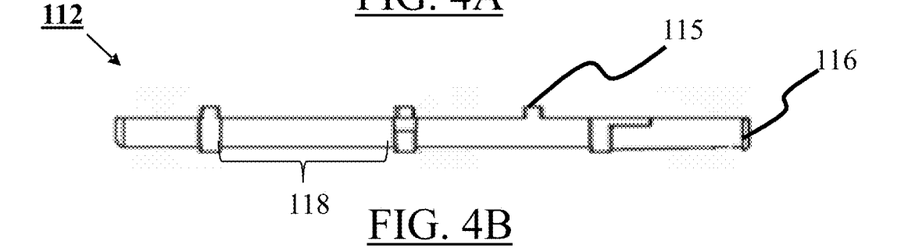
FIG. 4B provides a side view of an example first clamshell of a cable pulling device, in accordance with the present disclosure.
Figure 4C:
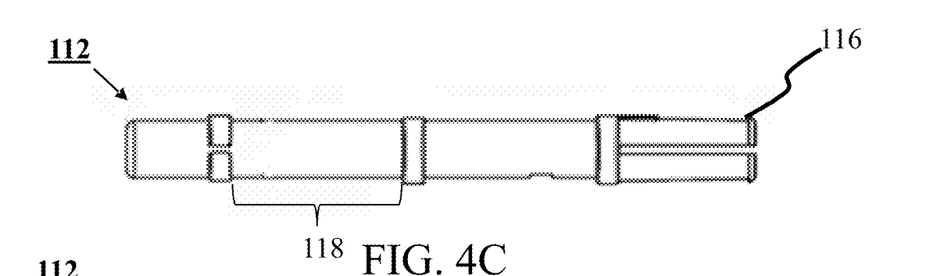
FIG. 4C provides a bottom view of an example first clamshell of a cable pulling device, in accordance with the present disclosure.
Figure 4D:
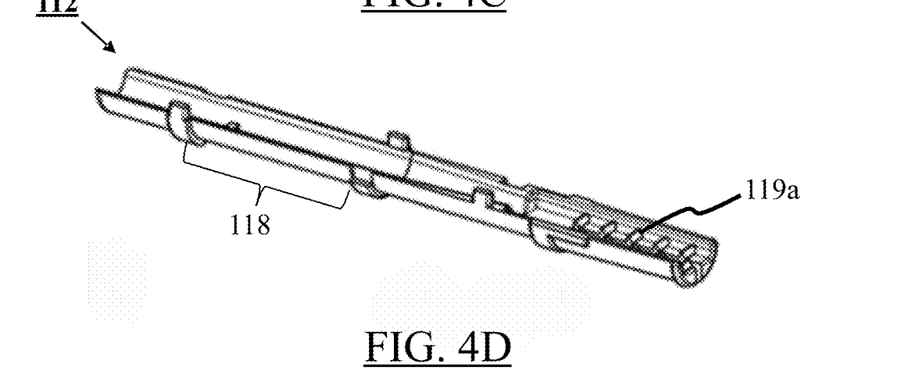
FIG. 4D provides a perspective view of an example first clamshell of a cable pulling device, in accordance with the present disclosure.
Figure 5A:
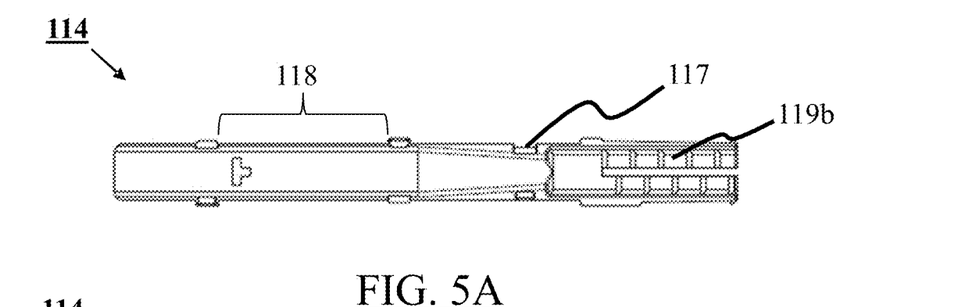
FIG. 5A provides a bottom view of an example second clamshell of a cable pulling device, in accordance with the present disclosure.
Figure 5B:
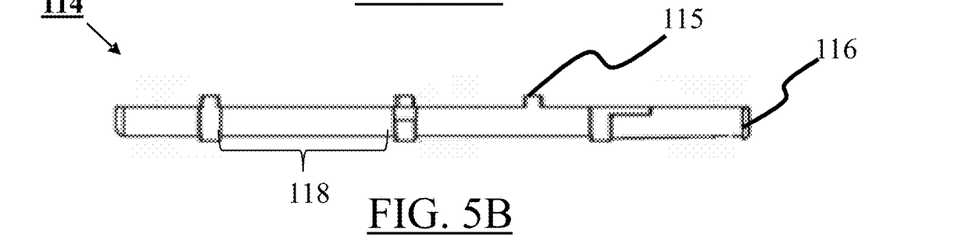
FIG. 5B provides a side view of an example second clamshell of a cable pulling device, in accordance with the present disclosure.
Figure 5C:
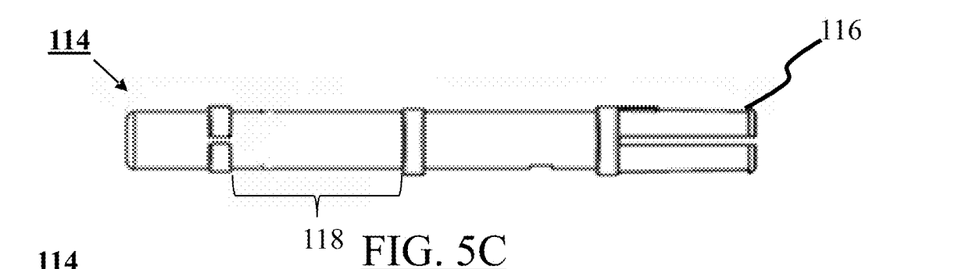
FIG. 5C provides a top view of an example second clamshell of a cable pulling device, in accordance with the present disclosure.
Figure 5D:
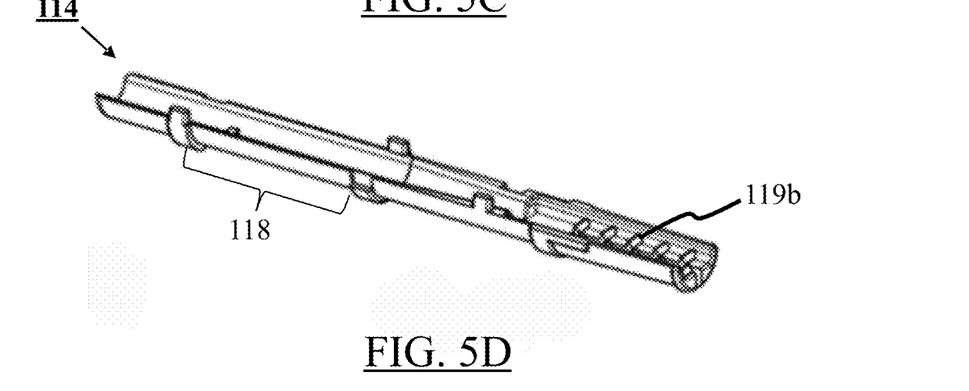
FIG. 5D provides a perspective view of an example second clamshell of a cable pulling device, in accordance with the present disclosure.

FIGS. 3A-3B show an example cable 200 for use in the system 100. The system 100 can include distal end piece (210) configured to be disposed at a distal end (202) of a cable (200) and extending from a proximal portion (211) to a distal portion (213). The distal end piece (210) can include a bifurcate aperture (212) disposed at the distal portion (213) and configured to receive a first end (122) and a second end (124) of a cord (120) to form a loop (126) extending distally from the bifurcate aperture (212). Bifurcate aperture 212 can be include a bifurcating channel configured to direct first end 122 and second end 124 in substantially opposite directions. Cable 200 can be a fiber optic cable. This particular cable can include a Subscriber Connector (SC)/Angled Physical Contact (ACP) pushable connector and dust cap.

FIGS. 4A-6 show various components of a cable pulling device (100) according to the present disclosure. The cable pulling device (100) can include a clamshell housing (110) including a first elongate clamshell (112) and a second elongate clamshell (114) configured to engage the first elongate clamshell (112) such that the clamshell housing (110) can house a distal end piece (210) disposed at a distal end (202) of cable (200). The device can include a cord (120) extending from a first end (122) to a second end (124), wherein the first end (122) and the second end (124) being configured to extend through a bifurcate aperture (212) disposed at a distal end (214) of the distal end piece (210) to form a loop (126). The cable pulling device (100) can include a locking ring (130) configured to surround and hold together the first elongate clamshell (112) and the second elongate clamshell (114).

FIGS. 4A-4D show the first clamshell (112) of the clamshell housing 110. In some embodiments, the clamshell housing (110) can further include a locking tab (116) disposed at the proximal end and configured to prevent the locking ring (130) from being removed from the clamshell housing (110). The first clamshell 112 can be split at the proximal portion 111 of the clamshell housing 110 such that the proximal portion can compress toward the longitudinal axis L-L and facilitate placement of the locking ring 130. The split proximal portion 111 will expand once the locking ring 130 is in place, thus securing the locking ring with locking tab 116.

In some embodiments, the first elongate clamshell (112) can include at least one tongue (115), and the second elongate clamshell (114) can include at least one groove (117). Alternatively, or additionally, the second elongate clamshell (112) can include at least one tongue (115), and the first elongate clamshell (114) can include at least one groove (117). Each tongue (115) can mate with a respective groove (117) on the opposite clamshell to prevent the first elongate clamshell (112) and the second elongate clamshell (114) from slipping relative to one another, particularly in the longitudinal direction.

In some embodiments, the first elongate clamshell (112) can include a plurality of teeth (119a) configured to engage with a ribbed cable reinforcement section (204) of the cable (200). The second elongate clamshell (114) can include a plurality of teeth (119b) configured to engage with the ribbed cable reinforcement section (204) of the cable (200).

FIGS. 5A-5D show the second clamshell (114) of the clamshell housing 110. The second clamshell 114 can generally form half of the clamshell housing 110, complimenting the first clamshell 112. The second clamshell 114 can include a plurality of teeth 119b configured to engage with a ribbed cable reinforcement section (204) of the cable (200).

In some embodiments, the first elongate clamshell (112) and the second elongate can form a generally figure-eight shaped opening configured to engage a generally figure-eight shaped wire jacket.

Figure 6A:
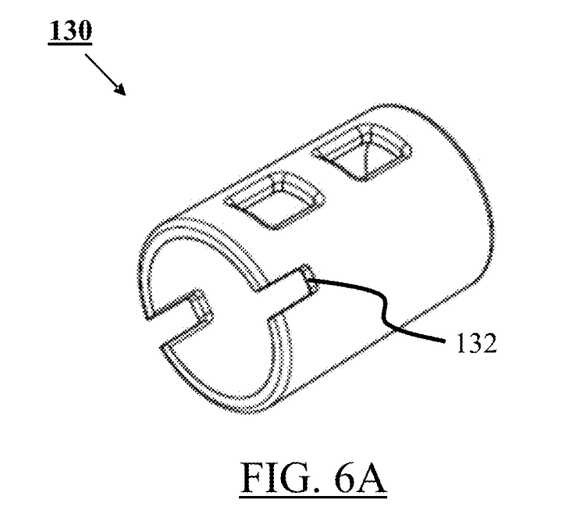
FIG. 6A provides a perspective view of an example locking ring, in accordance with the present disclosure.
Figure 6B:
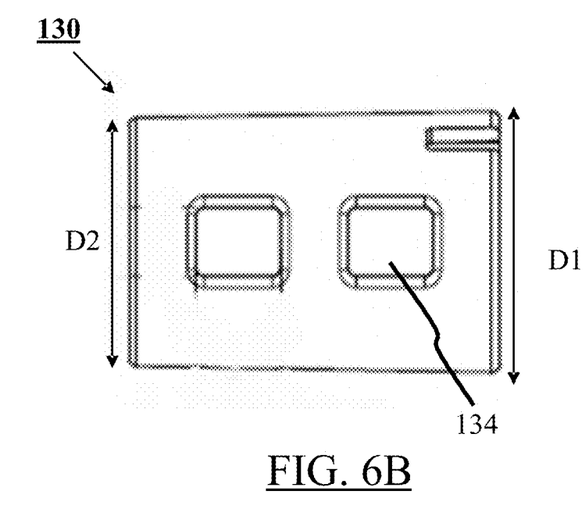
FIG. 6B provides a side view of an example locking ring, in accordance with the present disclosure.

FIGS. 6A-6B depict locking ring 130. Locking ring (130) can be to surround and hold together the first elongate clamshell (112) and the second elongate clamshell (114) at respective proximal portions (111a, 111b) of the first (112) and second (114) elongate clamshells. Locking ring 130 can have a proximal opening diameter D1 that is larger than a distal opening diameter D2 to facilitate sliding locking ring 130 over the proximal portion 111 of the clamshell housing 110.

In some embodiments, the locking ring 130 can include a slot (132) configured to engage the clamshell housing (110) and thus prevent rotation of the locking ring 130.

Locking ring 130 can also include one or more holes 134 to facilitate its removal by cutting/breaking it off, such as with wire cutters or pliers or other methods.

Figure 7:
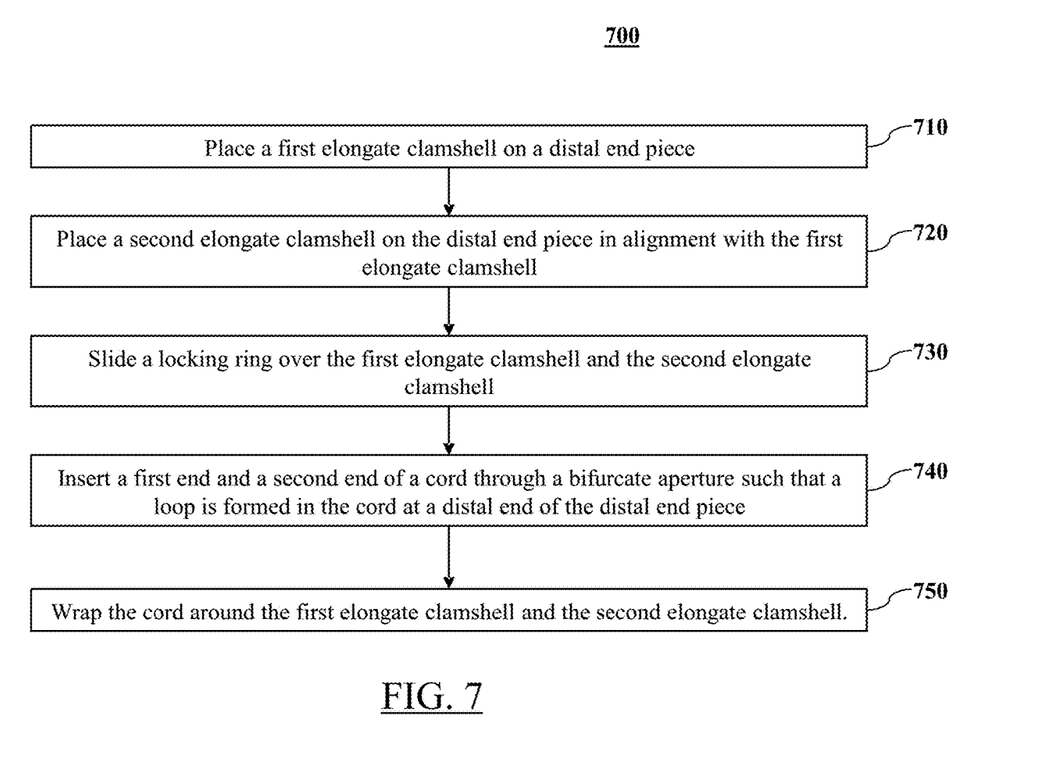
FIG. 7 provides a flow chart for a method of preparing a cable for pulling, in accordance with the present disclosure.

FIG. 7 depicts a method (700) of preparing a cable for pulling. The method can include placing (710) a first elongate clamshell on a distal end piece, placing (720) a second elongate clamshell on the distal end piece in alignment with the first elongate clamshell, and sliding (730) a locking ring over the first elongate clamshell and the second elongate clamshell. The method can further include inserting (740) a first end and a second end of a cord through a bifurcate aperture such that a loop is formed in the cord at a distal end of the distal end piece, and wrapping (750) the cord around the first elongate clamshell and the second elongate clamshell. Once wrapped, the cord can be secured with methods appreciated by those skilled in the pertinent art.

In some embodiments, sliding (730) the locking ring can include locking the ring in axial relation to the first elongate clamshell and the second elongate clamshell. Sliding (730) the locking ring can further include engaging a slot of the ring with the clamshell housing so as to prevent rotation of the locking ring.

In some embodiments, wrapping (750) the cord around the first elongate clamshell and the second elongate clamshell can include wrapping the cord in a cord groove.

In some embodiments, placing (710) the first elongate clamshell on the distal end piece and placing (720) the second elongate clamshell on the distal end piece can include aligning (715, 725) a plurality of teeth of the first elongate clamshell and a plurality of teeth of the second elongate clamshell with a ribbed cable reinforcement section of the cable.

Method 700 can be carried out with the cable pulling device 100 or the cable pulling system as previously described, and their respective subcomponents. This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A cable pulling device, the device comprising:
   a clamshell housing comprising:
      a first elongate clamshell; and
      a second elongate clamshell configured to engage the first elongate clamshell such that the clamshell housing can house a distal end piece disposed at a distal end of a cable;
   a cord extending from a first end to a second end, wherein the first end and the second end are configured to extend through a bifurcate aperture disposed at a distal end of the distal end piece to form a loop; and
   a locking ring configured to surround and hold together the first elongate clamshell and the second elongate clamshell.

2. The device of claim 1, the clamshell housing further comprising a locking tab disposed at a proximal portion of the clamshell housing and configured to prevent the locking ring from being removed from the clamshell housing.

3. The device of claim 1, the locking ring comprising a slot configured to engage the clamshell housing to prevent rotation of the locking ring.

4. The device of claim 1, wherein the cord comprises a knot formed in the loop such that the knot prevents the loop from passing through the bifurcate aperture.

5. The device of claim 1, the clamshell housing further comprising a cord groove formed from the first elongate clamshell and the second elongate clamshell, the cord groove configured to facilitate securing a distal portion of the clamshell housing by wrapping the cord around the first elongate clamshell and the second elongate clamshell in the cord groove.

6. The device of claim 1, the first elongate clamshell comprising at least one tongue, and
   the second elongate clamshell comprising at least one groove.

7. The device of claim 1, the first elongate clamshell comprising a plurality of teeth configured to engage with a ribbed cable reinforcement section of the cable, and
   the second elongate clamshell comprising a plurality of teeth configured to engage with the ribbed cable reinforcement section of the cable.

8. A cable pulling system, the system comprising:
   a distal end piece configured to be disposed at a distal end of a cable and extending from a proximal portion to a distal portion, the distal end piece comprising a bifurcate aperture disposed at the distal portion and configured to receive a first end and a second end of a cord to form a loop extending distally from the bifurcate aperture;
   a clamshell housing comprising:
      a first elongate clamshell; and
      a second elongate clamshell configured to engage the first elongate clamshell such that the first elongate clamshell and the second elongate clamshell house the distal end piece; and a locking ring configured to surround and hold together the first elongate clamshell and the second elongate clamshell at respective proximal portions of the first and second elongate clamshells.

9. The system of claim 8, the clamshell housing further comprising a locking tab disposed at a proximal end and configured to prevent the locking ring from being removed from the clamshell housing.

10. The system of claim 8, the locking ring comprising a slot configured to engage the clamshell housing and thus prevent rotation of the locking ring.

11. The system of claim 8, wherein the cord comprises a knot formed in the loop distal to the bifurcate aperture such that the knot prevents the loop from passing through the bifurcate aperture.

12. The system of claim 8, the clamshell housing further comprising a cord groove formed from the first elongate clamshell and the second elongate clamshell, the cord groove configured to facilitate securing a distal portion of the clamshell housing by wrapping the cord around the first elongate clamshell and the second elongate clamshell in the cord groove.

13. The system of claim 8, the first elongate clamshell comprising at least one tongue, and
the second elongate clamshell comprising at least one groove.

14. The system of claim 8, the first elongate clamshell comprising a plurality of teeth configured to engage with a ribbed cable reinforcement section of the cable, and
the second elongate clamshell comprising a plurality of teeth configured to engage with the ribbed cable reinforcement section of the cable.

15. The system of claim 8, the first elongate clamshell and the second elongate clamshell forming a generally figure-eight shaped opening configured to engage a generally figure-eight shaped wire jacket.

16. A method of preparing a cable for pulling, the method comprising:
placing a first elongate clamshell on a distal end piece;
placing a second elongate clamshell on the distal end piece in alignment with the first elongate clamshell;
sliding a locking ring over the first elongate clamshell and the second elongate clamshell;
inserting a first end and a second end of a cord through a bifurcate aperture such that a loop is formed in the cord at a distal end of the distal end piece; and
wrapping the cord around the first elongate clamshell and the second elongate clamshell.

17. The method of claim 16, wherein sliding the locking ring further comprises locking the ring in axial relation to the first elongate clamshell and the second elongate clamshell.

18. The method of claim 16, wherein sliding the locking ring further comprises engaging a slot of the ring with the first elongate clamshell and the second elongate clamshell.

19. The method of claim 16, wherein wrapping the cord around the first elongate clamshell and the second elongate clamshell comprises wrapping the cord in a cord groove.

20. The method of claim 16, wherein placing the first elongate clamshell on the distal end piece and placing the second elongate clamshell on the distal end piece comprises aligning a plurality of teeth of the first elongate clamshell and a plurality of teeth of the second elongate clamshell with a ribbed cable reinforcement section of the cable.

* * * * *